US012125436B1

(12) United States Patent
Koh et al.

(10) Patent No.: US 12,125,436 B1
(45) Date of Patent: Oct. 22, 2024

(54) PIXEL DRIVE CIRCUITRY BURN-IN COMPENSATION SYSTEMS AND METHODS

(71) Applicant: Apple Inc., Cupertino, CA (US)

(72) Inventors: Tae-Wook Koh, San Jose, CA (US); Mahesh B Chappalli, San Jose, CA (US); Vincent Z Young, San Francisco, CA (US); Yifan Zhang, Palo Alto, CA (US); Jared S Price, Hayward, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/325,451

(22) Filed: May 30, 2023

(51) Int. Cl.
*G09G 3/3208* (2016.01)

(52) U.S. Cl.
CPC ... *G09G 3/3208* (2013.01); *G09G 2320/0233* (2013.01); *G09G 2320/041* (2013.01); *G09G 2320/046* (2013.01)

(58) Field of Classification Search
None
See application file for complete search history.

(56) References Cited

U.S. PATENT DOCUMENTS

| | | | | |
|---|---|---|---|---|
| 8,922,599 | B2 | 12/2014 | Lai | |
| 2011/0227964 | A1* | 9/2011 | Chaji | G09G 3/006 345/82 |
| 2014/0375701 | A1 | 12/2014 | Chaji et al. | |
| 2020/0349894 | A1 | 11/2020 | Ko et al. | |
| 2022/0223104 | A1 | 7/2022 | Sun et al. | |

FOREIGN PATENT DOCUMENTS

| | | | |
|---|---|---|---|
| EP | 2050395 | A1 | 4/2009 |
| WO | 2017172011 | A1 | 10/2017 |

* cited by examiner

*Primary Examiner* — Christopher J Kohlman
(74) *Attorney, Agent, or Firm* — Fletcher Yoder P.C.

(57) ABSTRACT

An electronic device may include an electronic display having display pixels that display an image based on compensated image data. The electronic display may also include pixel drive circuitry that provides power to the display pixels in accordance with the compensated image data. Additionally, the electronic device may include burn-in compensation circuitry communicatively coupled to the electronic display that receives input image data and generates the compensated input image data based on the input image data, a pixel aging history corresponding to the display pixels, and a driver aging history corresponding to the pixel drive circuitry.

20 Claims, 9 Drawing Sheets

PIXEL DRIVE CIRCUITRY BURN-IN COMPENSATION SYSTEMS AND METHODS

BACKGROUND

This disclosure relates to image data processing to identify and compensate for burn-in/aging of pixels of an electronic display while also taking into account the burn-in/aging of the pixel drive circuitry.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous electronic devices including televisions, portable phones, computers, wearable devices, vehicle dashboards, virtual-reality glasses, and more display images on an electronic display. To display an image, an electronic display may control light emission of its display pixels based at least in part on corresponding image data. As electronic displays gain increasingly higher resolutions and dynamic ranges, they may also become increasingly more susceptible to image artifacts, such as burn-in related aging of pixels, that may be compensated by image processing.

Burn-in is a phenomenon whereby pixels degrade over time owing to the different amount of light that different pixels emit over time. In other words, pixels may age at different rates depending on their relative utilization and/or environment. For example, pixels used more than others may age more quickly, and thus may gradually emit less light when given the same amount of driving current or voltage values. This may produce undesirable burn-in image artifacts on the electronic display. In general, the estimated aging due to pixels' utilization may be stored, accumulated, and referenced when compensating for burn-in effects on pixel efficiency. However, while certain techniques may provide for burn-in compensation for pixel efficiency due to aging, such techniques may not account for aging due to other effects.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to identifying and/or compensating for non-uniform burn-in/aging of display pixels and the drive circuitry thereof. This may address the effects of aging due to the current flow through the pixel drive circuitry that provides current to the pixels. Burn-in related aging may vary across an electronic display based on individual or grouped pixel usage such as the frequency, luminance output, and/or environment (e.g., temperature) of the display pixels. As a result, some display pixels may gradually emit less light when given the same driving current or voltage values, effectively becoming darker than the other display pixels when given a signal for the same brightness level. In other words, the pixel efficiency of a display pixel may be reduced as the display pixel ages.

Additionally, the pixel drive circuitry (e.g., transistor(s), switch(es), etc.) that provides current to the display pixels may also exhibit aging over time based on its utilization. For example, the current delivered through the pixel drive circuitry may change based on the current delivered by the pixel drive circuitry throughout the life of the electronic display.

As such, image processing circuitry and/or software may monitor and/or model the amount of burn-in related aging that is likely to have occurred in the different pixels and monitor/model the amount of burn-in aging that is likely to have occurred in the pixel drive circuitry. By keeping track of the estimated amount of burn-in that has taken place in the electronic display, burn-in gain maps may be derived from the estimated amounts of aging (e.g., a pixel BIS history map and a driver BIS history map) to compensate for the burn-in effects. For example, a burn-in compensation/burn-in statistics (BIC/BIS) block may include a pixel BIS sub-block to track the estimated aging of the display pixels, a driver BIS sub-block to track the estimated aging of the pixel drive circuitry, and a BIC sub-block to apply gains to pixel values of the image data to compensate for the burn-in related aging of both the display pixels and the pixel drive circuitry.

Indeed, based on the estimated amounts of aging to the display pixels and the pixel drive circuitry, burn-in compensation may be performed to adjust image data values accordingly, before such signals are sent to the electronic display, to reduce or eliminate the appearance of burn-in artifacts on the electronic display. In this way, the pixels of the electronic display that are likely to exhibit the greatest amount of aging will appear to be equally as bright as pixels with less aging. As such, perceivable burn-in artifacts on the electronic display may be reduced or eliminated.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
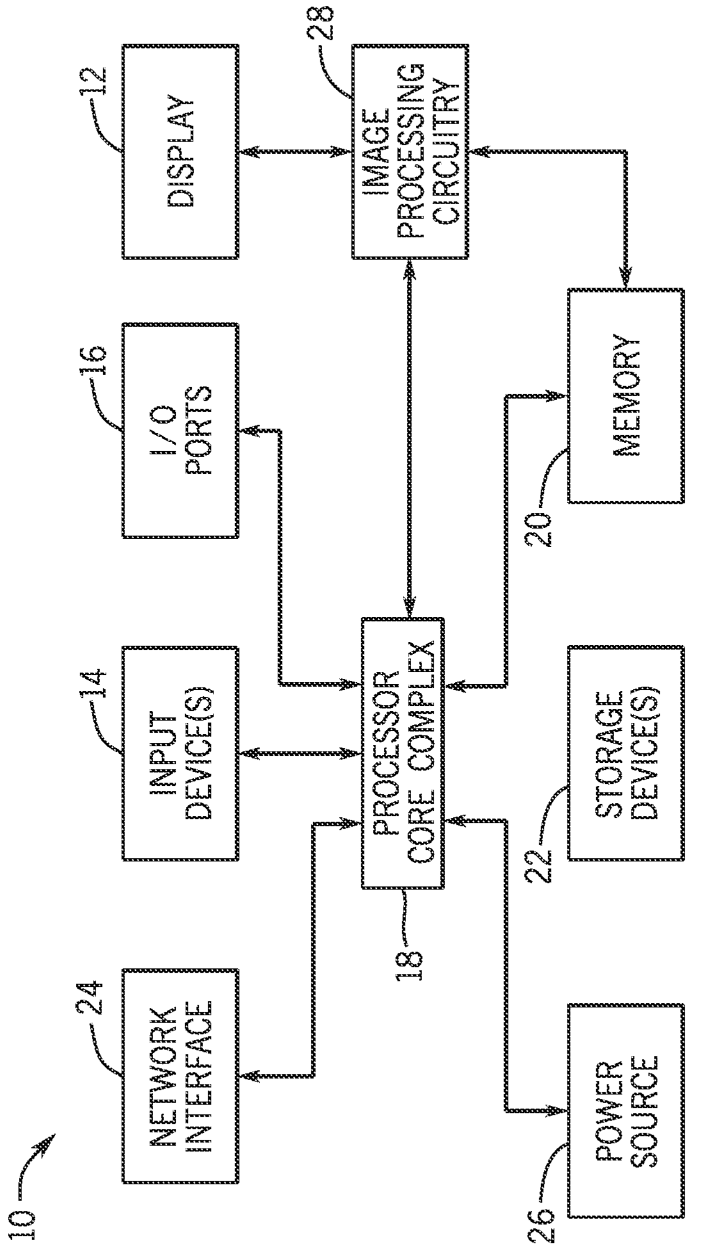
FIG. 1 is a schematic diagram of an electronic device that includes an electronic display, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays to present visual information. Such electronic devices may include computers, mobile phones, portable media devices, tablets, televisions, virtual-reality headsets, and vehicle dashboards, among many others. To display an image, an electronic display controls the luminance (and, as a consequence, the color) of its display pixels based on corresponding image data received at a particular resolution. For example, an image data source may provide image data as a stream of pixel data, in which data for each pixel indicates a target luminance (e.g., brightness and/or color) of one or more display pixels located at corresponding pixel positions. In some embodiments, image data may indicate luminance per color component, for example, via red component image data, blue component image data, and green component image data, collectively referred to as RGB image data (e.g., RGB, sRGB). Additionally or alternatively, image data may be indicated by a luma channel and one or more chrominance channels (e.g., YCbCr, YUV, etc.), grayscale (e.g., gray level), or other color basis. It should be appreciated that a luma channel, as disclosed herein, may encompass linear, non-linear, and/or gamma-corrected luminance values.

Additionally, the image data may be processed to account for one or more physical or digital effects associated with displaying the image data. For example, burn-in/aging of display pixels may be estimated based on the frequency, luminance output, and/or environment (e.g., temperature) of the display pixels. Indeed, as display pixels are utilized throughout the life of the electronic display, the pixel efficiencies of the display pixels may be reduced. In general, by keeping track of the estimated amount of burn-in that has taken place in the electronic display, burn-in gain maps may be derived to compensate for the effects of burn-in. The burn-in gain maps may gain down image data that will be sent to the less-aged pixels (which would otherwise be brighter) without gaining down, or by gaining down less, the image data that will be sent to the pixels with the greatest amount of aging (which would otherwise be darker). In this way, the pixels of the electronic display that are likely to exhibit the greatest amount of aging will appear to be equally as bright as pixels with less aging. Additionally or alternatively, pixels with the higher amounts of estimated burn-in may be gained up to compensate for their reduced luminance output depending on the capabilities of the pixel relative to the desired luminance levels. As such, perceivable burn-in artifacts on the electronic display may be reduced or eliminated.

However, while such techniques may provide for burn-in compensation for pixel efficiency due to aging, such techniques, alone, may not account for the aging of pixel drive circuitry that provides current to the display pixels. Indeed, over time and through utilization the pixel drive circuitry may exhibit aging, due to the current flow through the pixel drive circuitry, which results in changes in the amount of current delivered to the display pixels. As such, the amount of burn-in related aging that is likely to have occurred in the pixel drive circuitry may be monitored/tracked, and the burn-in gain maps may be derived from the estimated amounts of aging to compensate for the burn-in effects. For example, the burn-in gain maps may gain down image data that will be used to send current through less-aged pixel drive circuitry (which would otherwise deliver more current) without gaining down, or by gaining down less, the image data that will be used to send current through pixel drive circuitry with the greatest amount of aging (which would otherwise deliver less current).

Moreover, the estimated amounts of aging of the pixel drive circuitry and the estimated amounts of aging of the display pixels may be utilized together to generate the gain maps. For example, a burn-in compensation/burn-in statistics (BIC/BIS) block may include a pixel BIS sub-block to track the estimated aging of the display pixels, a driver BIS sub-block to track the estimated aging of the pixel drive circuitry, and a BIC sub-block to apply gains to pixel values of the image data to compensate for the burn-in related aging of both the display pixels and the pixel drive circuitry.

With the foregoing in mind, FIG. 1 is an example electronic device 10 with an electronic display 12 having multiple display pixels. As described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Moreover, the image processing circuitry 28 (e.g., a graphics processing unit, a display image processing pipeline, etc.) may be included in the processor core complex 18 or be implemented separately.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a BLUETOOTH® network, a local area network (LAN), such as an 802.11x Wi-Fi network, or a wide area network (WAN), such as a 4G, Long-Term Evolution (LTE), or 5G cellular network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) (e.g., of an operating system or computer program), an application interface, text, a still image, and/or video content. The electronic display 12 may include a display panel with one or more display pixels to facilitate displaying images. Additionally, each display pixel may represent one of the sub-pixels that control the luminance of a color component (e.g., red, green, or blue). As used herein, a display pixel may refer to a collection of sub-pixels (e.g., red, green, and blue subpixels) or may refer to a single sub-pixel.

As described above, the electronic display 12 may display an image by controlling the luminance output (e.g., light emission) of the sub-pixels based on corresponding image data. In some embodiments, pixel or image data may be generated by or received from an image source, such as the processor core complex 18, a graphics processing unit (GPU), storage device 22, or an image sensor (e.g., camera). Additionally, in some embodiments, image data may be received from another electronic device 10, for example, via the network interface 24 and/or an I/O port 16. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
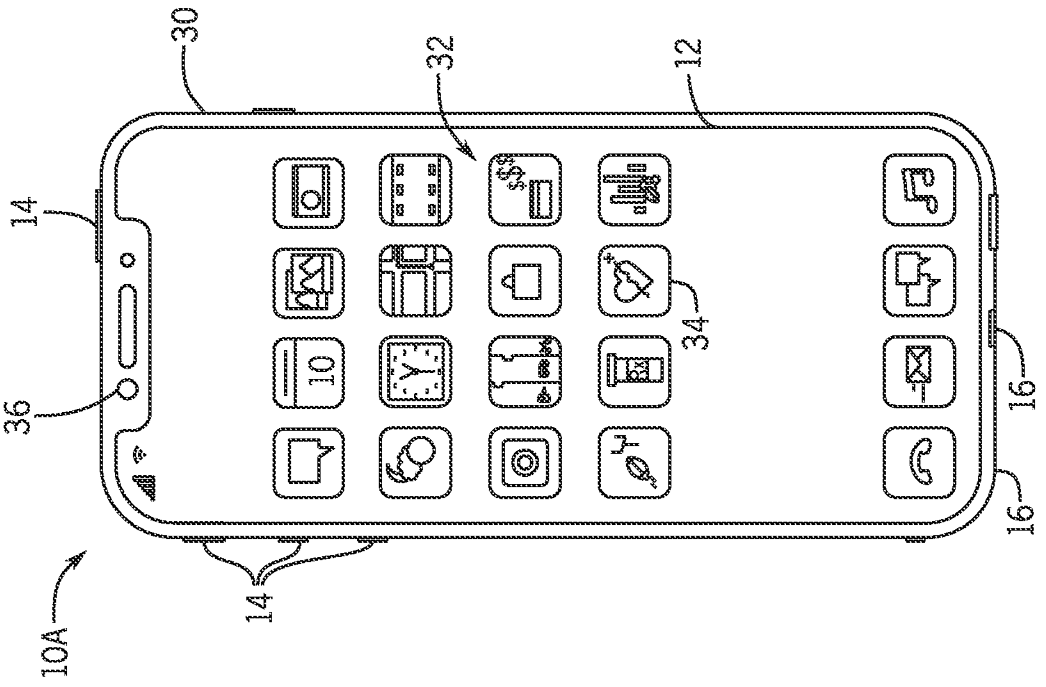
FIG. 2 is an example of the electronic device of FIG. 1 in the form of a handheld device, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smartphone, such as an IPHONE® model available from Apple Inc.

The handheld device 10A may include an enclosure 30 (e.g., housing) to, for example, protect interior components from physical damage and/or shield them from electromagnetic interference. The enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Input devices 14 may be accessed through openings in the enclosure 30. Moreover, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
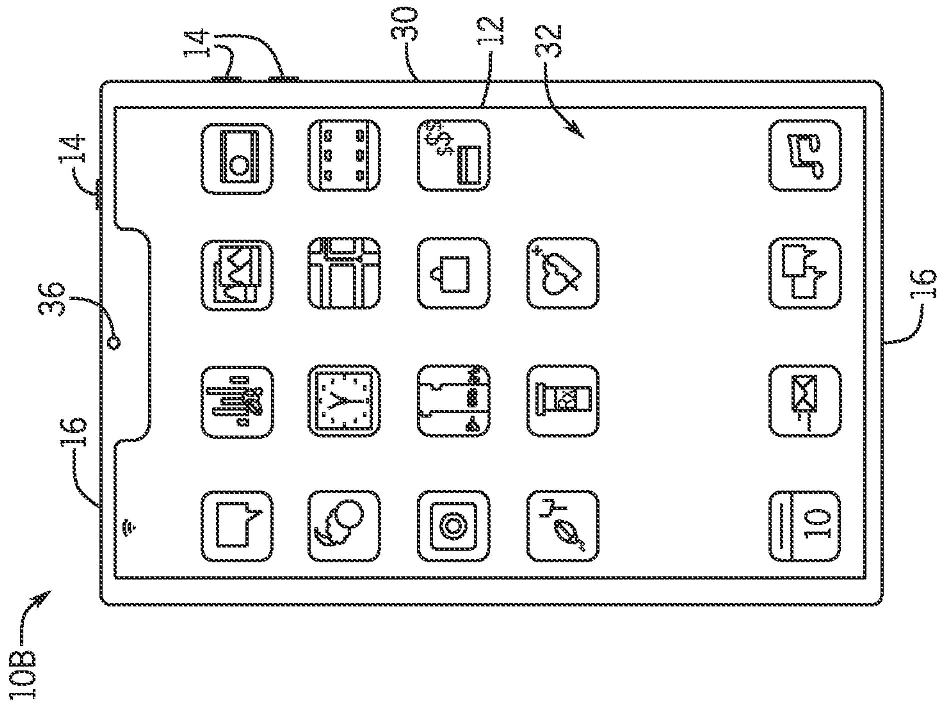
FIG. 3 is another example of the electronic device of FIG. 1 in the form of a tablet device, in accordance with an embodiment.
Figure 4:
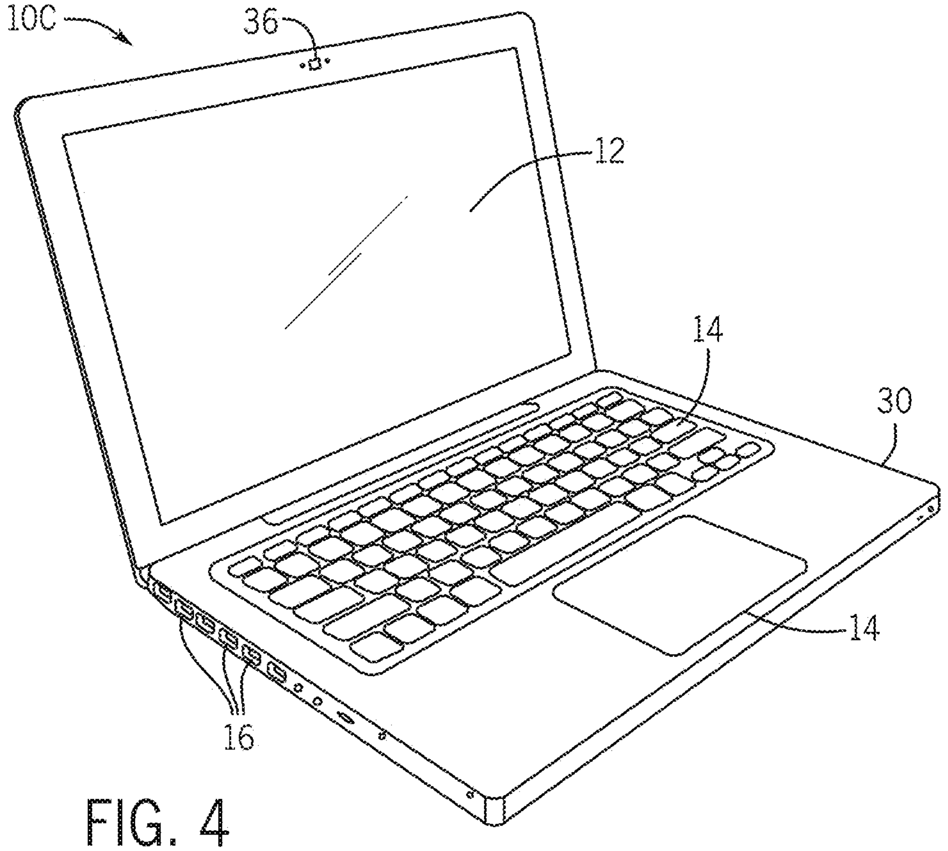
FIG. 4 is another example of the electronic device of FIG. 1 in the form of a computer, in accordance with an embodiment.
Figure 5:
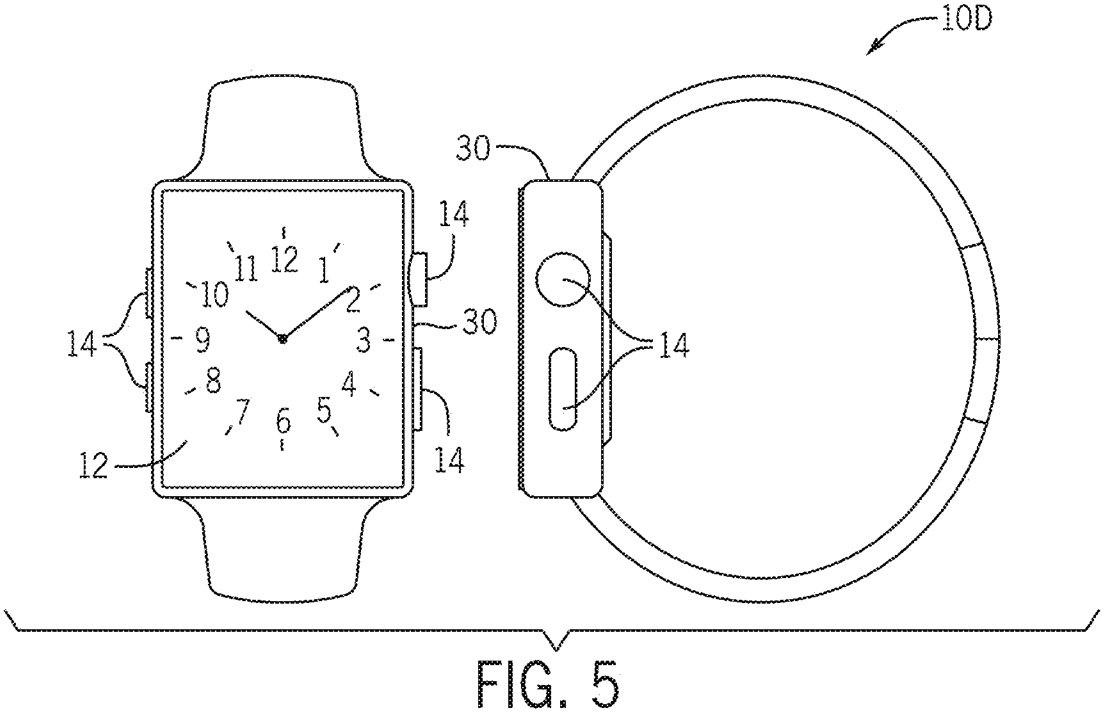
FIG. 5 is another example of the electronic device of FIG. 1 in the form of a watch, in accordance with an embodiment.

Another example of a suitable electronic device 10, specifically a tablet device 10B, is shown in FIG. 3. For illustration purposes, the tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
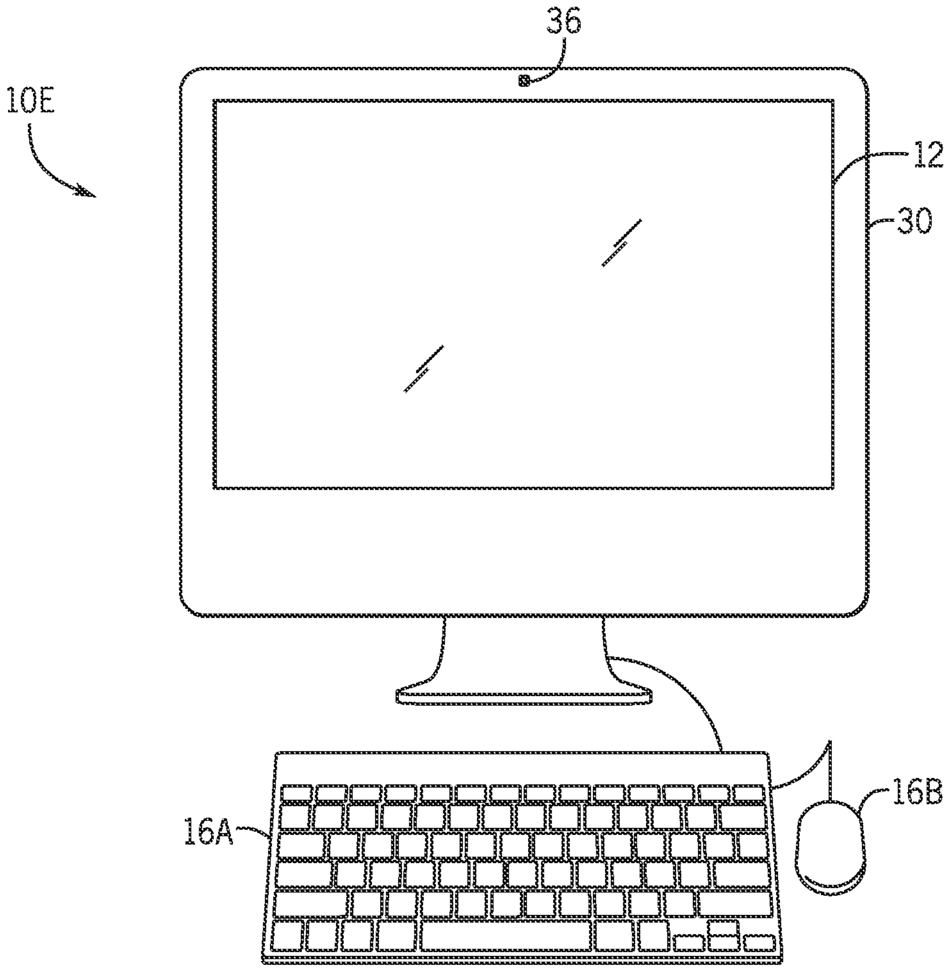
FIG. 6 is another example of the electronic device of FIG. 1 in the form of a computer, in accordance with an embodiment.

Turning to FIG. 6, a computer 10E may represent another embodiment of the electronic device 10 of FIG. 1. The computer 10E may be any suitable computer, such as a desktop computer, a server, or a notebook computer, but may also be a standalone media player or video gaming machine. By way of example, the computer 10E may be an IMAC®, a MACBOOK®, or other similar device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer 10E using various peripheral input devices 14, such as a keyboard 14A or mouse 14B, which may connect to the computer 10E.

As described above, the electronic display 12 may display images based at least in part on image data. Before being used to display a corresponding image on the electronic display 12, the image data may be processed, for example, via the image processing circuitry 28. Moreover, the image processing circuitry 28 may process the image data for display on one or more electronic displays 12. For example, the image processing circuitry 28 may include a display pipeline, memory-to-memory scaler and rotator (MSR) circuitry, warp compensation circuitry, or additional hardware or software means for processing image data. The image data may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

Figure 7:
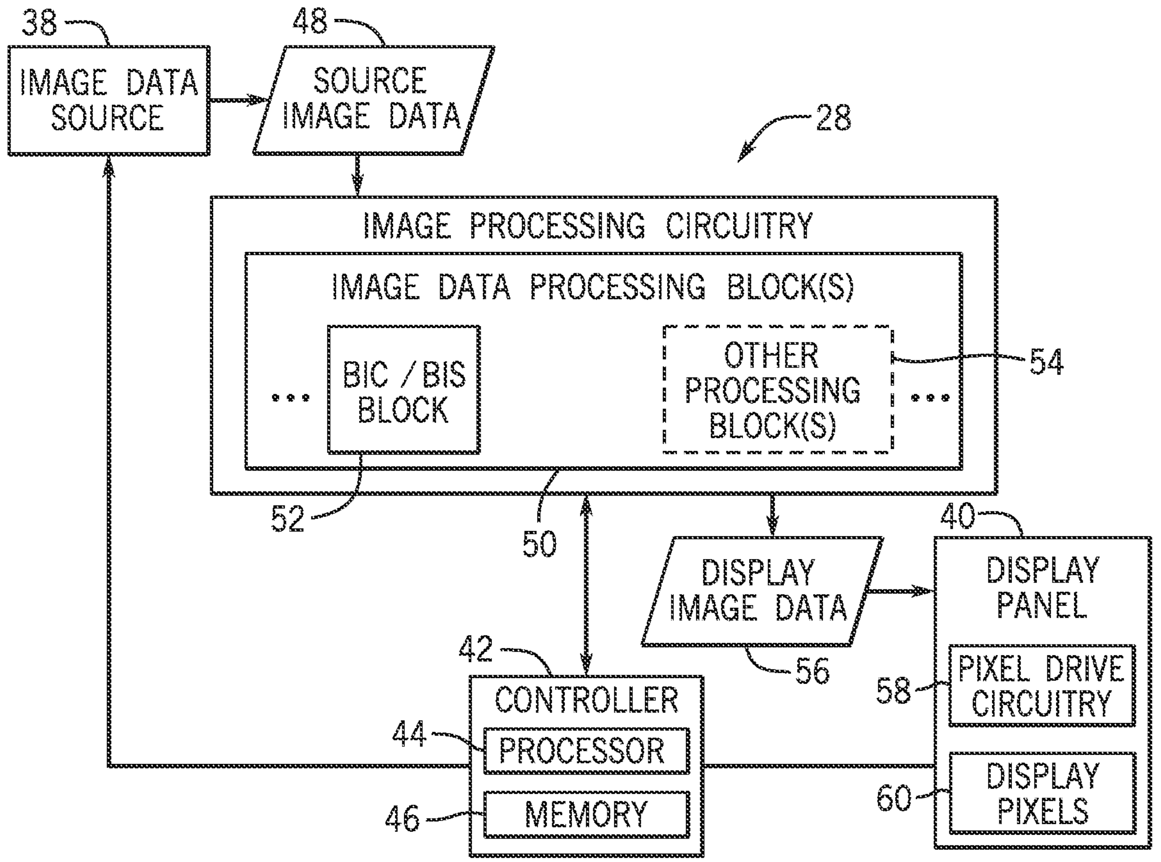
FIG. 7 is a schematic diagram of the image processing circuitry of FIG. 1 including a burn-in compensation (BIC)/burn-in statistics (BIS) block, in accordance with an embodiment.

To help illustrate, a portion of the electronic device 10, including image processing circuitry 28, is shown in FIG. 7. The image processing circuitry 28 may be implemented in the electronic device 10, in the electronic display 12, or a combination thereof. For example, the image processing circuitry 28 may be included in the processor core complex 18, a timing controller (TCON) in the electronic display 12, or any combination thereof. As should be appreciated, although image processing is discussed herein as being performed via a number of image data processing blocks, embodiments may include hardware and/or software components to carry out the techniques discussed herein.

The electronic device 10 may also include an image data source 38, a display panel 40, and/or a controller 42 in communication with the image processing circuitry 28. In some embodiments, the display panel 40 of the electronic display 12 may be a self-emissive display (e.g., organic light-emitting-diode (OLED) display, micro-LED display, etc.), a transmissive display (e.g., liquid crystal display (LCD)), or any other suitable type of display panel 40. In some embodiments, the controller 42 may control operation of the image processing circuitry 28, the image data source 38, and/or the display panel 40. To facilitate controlling operation, the controller 42 may include a controller processor 44 and/or controller memory 46. In some embodiments, the controller processor 44 may be included in the processor core complex 18, the image processing circuitry 28, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 28 may receive source image data 48 corresponding to a desired image to be displayed on the electronic display 12 from the image data source 38. The source image data 48 may indicate target characteristics (e.g., pixel data) corresponding to the desired image using any suitable source format, such as an RGB format, an αRGB format, a YCbCr format, and/or the like. Moreover, the source image data may be fixed or floating point and be of any suitable bit-depth. Furthermore, the source image data 48 may reside in a linear color space, a gamma-corrected color space, or any other suitable color space. Moreover, as used herein, pixel data/values of image data may refer to individual color component (e.g., red, green, and blue) data values corresponding to pixel positions of the display panel.

As described above, the image processing circuitry 28 may operate to process source image data 48 received from the image data source 38. The image data source 38 may include captured images (e.g., from one or more cameras 36), images stored in memory, graphics generated by the processor core complex 18, or a combination thereof. Additionally, the image processing circuitry 28 may include one or more image data processing blocks 50 (e.g., circuitry, modules, or processing stages) such as a burn-in compensation (BIC)/burn-in statistics (BIS) block 52. As should be appreciated, multiple other processing blocks 54 may also be incorporated into the image processing circuitry 28, such as a pixel contrast control (PCC) block, color management block, a dither block, a blend block, a warp block, a scaling/rotation block, etc. before and/or after the BIC/BIS block 52. The image data processing blocks 50 may receive and process source image data 48 and output display image data 56 in a format (e.g., digital format, image space, and/or resolution) interpretable by the display panel 40. Further, the functions (e.g., operations) performed by the image processing circuitry 28 may be divided between various image data processing blocks 50, and, while the term "block" is used herein, there may or may not be a logical or physical separation between the image data processing blocks 50. After processing, the image processing circuitry 28 may output the display image data 56 to the display panel 40. Based at least in part on the display image data 56, analog electrical signals may be provided, via pixel drive circuitry 58, to display pixels 60 of the display panel 40 to illuminate the display pixels 60 at a desired luminance level and display a corresponding image.

As discussed herein, the image processing circuitry may include a BIC/BIS block 52 to collect statistics about the degree to which burn-in is expected to have occurred on the electronic display 12 (e.g., pixel drive circuitry 58 and display pixels 60) and compensate for burn-in related aging to reduce or eliminate the visual effects of burn-in. As display pixels 60 are utilized throughout the life of the electronic display 12, the pixel efficiencies of the display pixels 60 may be reduced. For example, the more luminance output provided by a particular display pixel 60, the more burn-in related aging the display pixel 60 may exhibit.

Moreover, in addition to the efficiencies of the display pixels 60 themselves, the pixel drive circuitry 58 that delivers current to the display pixels 60 may also exhibit burn-in related aging. For example, the more current delivered by particular pixel drive circuitry 58 the more burn-in related aging the pixel drive circuitry 58 may exhibit. As such, the pixel drive circuitry 58 and display pixels 60 may age non-uniformly across the display panel 40 based on their utilization, which may be content dependent (e.g., based on the display image data 56). Furthermore, the utilization of the pixel drive circuitry 58 and display pixels 60 may be based on the same display image data 56, as the current delivered by the pixel drive circuitry 58 according to the display image data 56 causes the luminance output of the display pixels 60. However, in some scenarios, the current delivered by the pixel drive circuitry 58 may have a non-linear relationship with the luminance output of the display pixels 60. Moreover, the amount of aging to the pixel drive circuitry 58 due to the current therethrough may have a non-linear relationship with the aging of the display pixels 60 for a particular pixel value of the display image data 56. As such, the estimated burn-in related aging of the pixel drive circuitry 58 due to current flow may be tracked independently of the burn-in related aging (e.g., pixel efficiency) of the display pixels 60.

Figure 8:
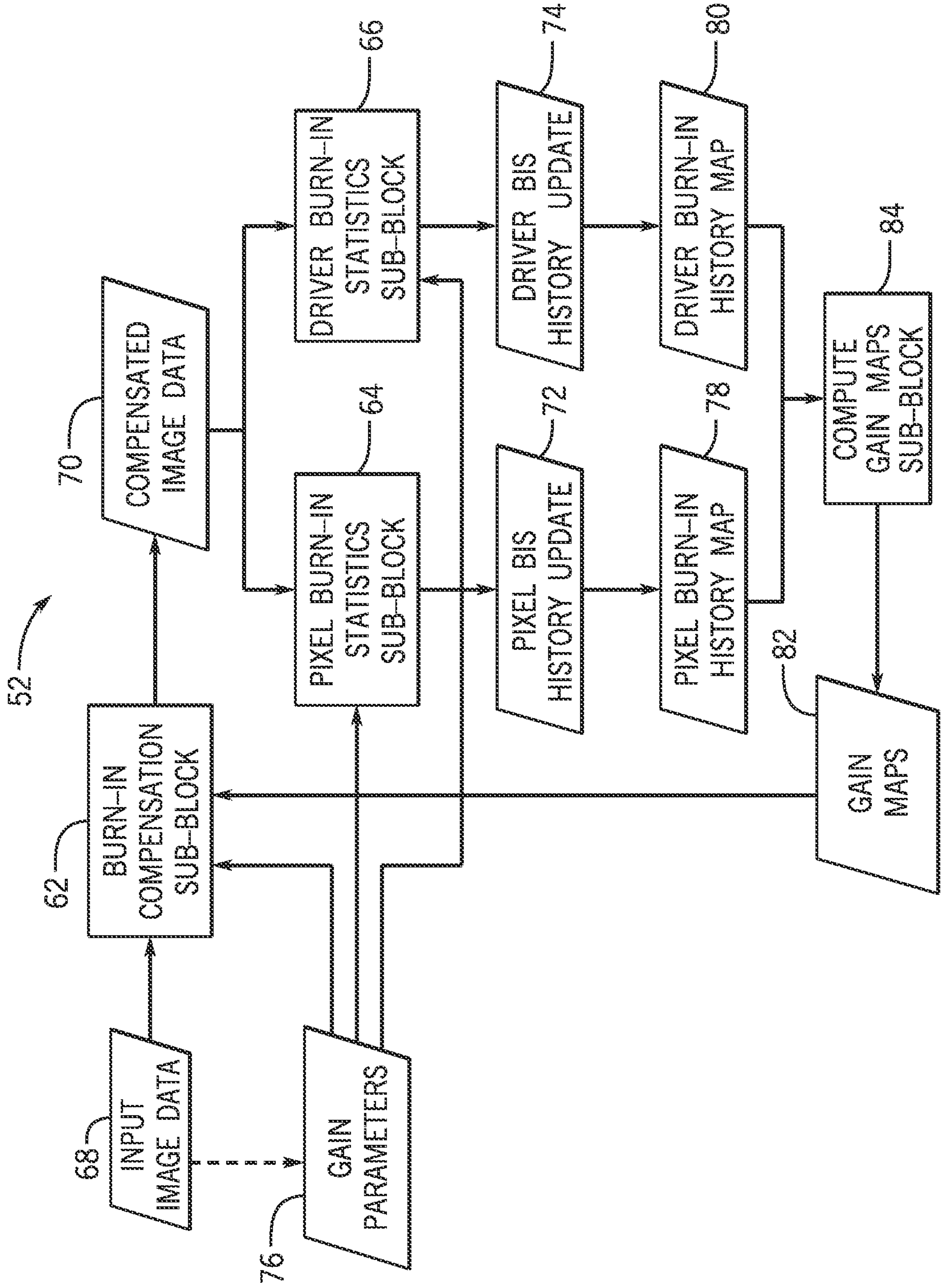
FIG. 8 is a schematic diagram of the BIC/BIS block of FIG. 7 including a BIC sub-block, a pixel BIS sub-block, and a driver BIS sub-block, in accordance with an embodiment.

To help illustrate, FIG. 8 is an example block diagram of the BIC/BIS block 52 including a BIC sub-block 62, a pixel BIS sub-block 64 and a driver BIS sub-block 66. In general the BIC/BIS block 52 receives input image data 68 (e.g., pixel values) and compensates the input image data 68 (e.g., via the BIC sub-block 62) by applying gains thereto. As such, compensated image data 70 may be generated and output from the BIC/BIS block 52. As should be appreciated, as used herein, the input image data 68 may be in any suitable format (e.g., linear domain, gamma domain, current domain) and may be indicative of the source image data 48 or image data at any point within the image processing circuitry 28 (e.g., before and/or after other processing blocks 54) leading to the BIC/BIS block 52. Moreover, as should be appreciated, the compensated image data 70 may be output as display image data 56 or further processed via one or more other processing blocks 54 after the BIC/BIS block 52.

Based on the compensated image data 70, which may more closely resemble the current utilizations and luminance outputs than the input image data 68, the pixel BIS sub-block 64 and driver BIS sub-block may generate a pixel BIS history update 72 and a driver BIS history update 74, respectively. The pixel BIS history update 72 is an incremental update representing an increased amount of pixel aging that is estimated to have occurred (e.g., since a corresponding previous pixel BIS history update 72, for the current image frame, or other metric). Similarly, the driver BIS history update 74 is an incremental update representing an increased amount of pixel drive aging that is estimated to have occurred (e.g., since a corresponding previous driver BIS history update 74, for the current image frame, or other metric). As should be appreciated, the pixel BIS history update 72 and/or driver BIS history update 74 may be performed for each image frame, sub-sampled at a desired frequency (e.g., every other image frame, every third image frame, every fourth image frame, and so on), and/or the pixels may be divided into groups such that each group of pixels is sampled over a different image frame. In some embodiments, a pixel BIS history update 72 and a driver BIS history update 74 may be calculated concurrently for the same image frame (e.g., based on the same set on input image data 68/compensated image data 70) using dedicated (e.g., separate) hardware or independently (e.g., in series or parallel) in software. Additionally or alternatively, the pixel BIS history update 72 and the driver BIS history update 74 may be determined in series (e.g., one after the other) using the same hardware, and may be performed for the same image frame or multiplexed across separate image frames.

In some embodiments, gain parameters 76 and/or other variables and set values such as a normalization factor, a brightness adaptation factor, a duty cycle, and/or a global brightness setting, may be used in generating the pixel BIS history update 72 and driver BIS history update 74 to calculate or otherwise estimate the respective amounts of aging. Furthermore, each pixel BIS history update 72 and each driver BIS history update 74 may be aggregated, respectively, to maintain a pixel burn-in history map 78 and a driver burn-in history map 80, respectively. The pixel burn-in history map 78 is indicative of the total estimated burn-in that has occurred to the display pixels 60, and the driver burn-in history map 80 is indicative of the total estimated burn-in that has occurred to the pixel drive circuitry 58.

To compensate the input image data 68, gain maps 82 may be generated (e.g., via a compute gain maps sub-block 84) based on the pixel burn-in history map 78 and the driver burn-in history map 80. In some embodiments, the gain maps 82 may be two-dimensional (2D) maps (e.g., a gain map 82 for each color component pixel type) of per-pixel gains based on the changes in efficiency of and current delivered to the display pixels 60, as tracked via the pixel burn-in history map 78 and the driver burn-in history map 80. In some embodiments, the gain maps 82 may be programmed into 2D lookup tables (LUTs) for efficient use by the BIC sub-block 62. Furthermore, in some embodiments, the compute gain maps sub-block 84 may be implemented in hardware (e.g., as part of the BIC sub-block 62), in software (e.g., via the controller processor 44 or other processor of the electronic device 10), or partially in both.

As discussed above, the pixel BIS history updates 72 and driver BIS history updates 74 are used to maintain the pixel burn-in history maps 78 and driver burn-in history maps 80, respectively, which are used to generate the gain maps 82. For example, the gain maps 82 may gain down image data that will be used to send current through less-aged pixel drive circuitry 58 (which may otherwise deliver more current) without gaining down, by gaining down less, or by up gaining the image data that will be used to send current through pixel drive circuitry 58 with the greatest amount of aging (which may otherwise deliver less current). Moreover, the gain maps 82 may gain down pixel values that are associated with less-aged display pixels 60 (which would otherwise be brighter) without gaining down, by gaining down less, or by gaining up the pixel values associated with display pixels 60 with the greatest amount of aging (which would otherwise be darker). As discussed herein, the aging of the display pixels 60 and pixel drive circuitry 58 may or may not be linearly related, and, as such, the contributions to the gains of the gain maps 82 associated with the pixel drive circuitry 58 and display pixels 60 may be of the same or different magnitude and/or of the same or opposite sign (e.g., gaining down vs. gaining up).

Figure 9:
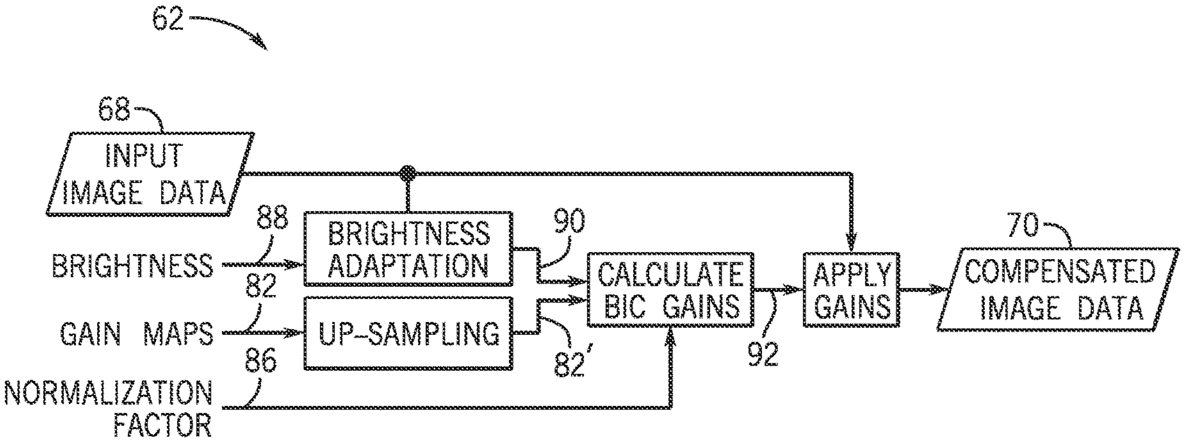
FIG. 9 is a schematic diagram of the BIC sub-block of FIG. 8, in accordance with an embodiment.

Additionally, in some embodiments, the gain maps 82 may be upsampled (e.g., generating upsampled gain maps 82') to spatially support the pixel-resolution of the display panel 40, as shown in FIG. 9. For example, the pixel burn-in history maps 78 and/or driver burn-in history maps 80 that track the estimated aging of the display pixels 60 and pixel drive circuitry 58 may be downsampled compared to the pixel-resolution of the display panel 40 (e.g., for storage and/or bandwidth reduction), and gain maps 82 derived therefrom may be upsampled accordingly. Using the upsampled gain maps 82' and one or more gain parameters 76, the BIC sub-block 62 may compensate the input image data 68 and generate compensated image data 70. The gain parameters 76 may augment the gain maps 82 during compensation to account for global, local, and/or average display characteristics for the image frame. For example, the gain parameters 76 utilized in the BIC sub-block 62 may include a normalization factor 86, global brightness setting 88, and/or a brightness adaptation factor 90, which may vary depending on the global brightness setting 88, the gray level of the input image data 68, the emission duty cycle of the display pixels 60, and/or to which color component (e.g., red, green, or blue) the gain parameters 76 are applied. As should be appreciated, the gain parameters 76 discussed herein are non-limiting, and additional parameters may also be included in determining the compensated image data 70 such as floating or fixed reference values and/or parameters representative of the type or model of display panel 40. As such, the gain parameters 76 may represent any suitable parameters that the BIC/BIS block 52 may use to appropriately adjust the values of and/or apply the gain maps 82 to compensate for burn-in.

In some embodiments, the normalization factor 86 may be used to normalize the gain values of the gain maps 82 (or upsampled gain maps 82' depending on implementation) with respect to a maximum gain for each color component. In this way, the display pixels 60 of the electronic display 12 that are likely to exhibit the greatest amount of aging will appear to be equally as bright as display pixels 60 with less aging. The brightness adaptation factor 90 may take any suitable form, and take into account the global brightness setting 88 of the electronic display 12, which may be set based on a user setting, an ambient light sensor, a time of day, and/or other parameters. Indeed, the global brightness setting 88 may be used to effect the degree of compensation to be applied. Additionally or alternatively, the brightness adaptation factor 90 may be based on an emission duty cycle of the display pixels 60, as the effect of burn-in on a display pixel 60 may differ at different emission duty cycles. In some embodiments, the brightness adaptation factor 90 may be determined via a lookup table (LUT) based on the input image data 68 scaled by a function of the global brightness setting 88 and the emission duty cycle. As should be appreciated, the brightness adaptation factor 90 may be obtained via a LUT, by computation (e.g., via a processor), or any suitable method accounting for the global brightness setting 88 of the electronic display 12 and/or the emission duty cycle of a pixel of interest. Additionally, in some embodiments, the normalization factor 86 may be a function of the brightness adaptation factor 90 or computed independently of the brightness adaptation factor 90. Moreover the normalization factor 86 may be computed on a per-component (e.g., color component) basis.

By combining the gain maps 82 (e.g., upsampled gain maps 82') with the normalization factor 86 and/or brightness adaptation factor 90, the BIC sub-block may generate per-pixel gains 92 that augment pixel values of the input image data 68 to compensate for the burn-in related aging of the pixel drive circuitry 58 and the display pixels 60. Thus, the compensated image data 70 may be generated by applying the per-pixel gains 92 to be the input image data 68. Furthermore, as discussed herein, the compensated image data 70 may be utilized by the pixel BIS sub-block 64 and the driver BIS sub-block 66 to generate the pixel BIS history update 72 and driver BIS history update 74.

Figure 10:
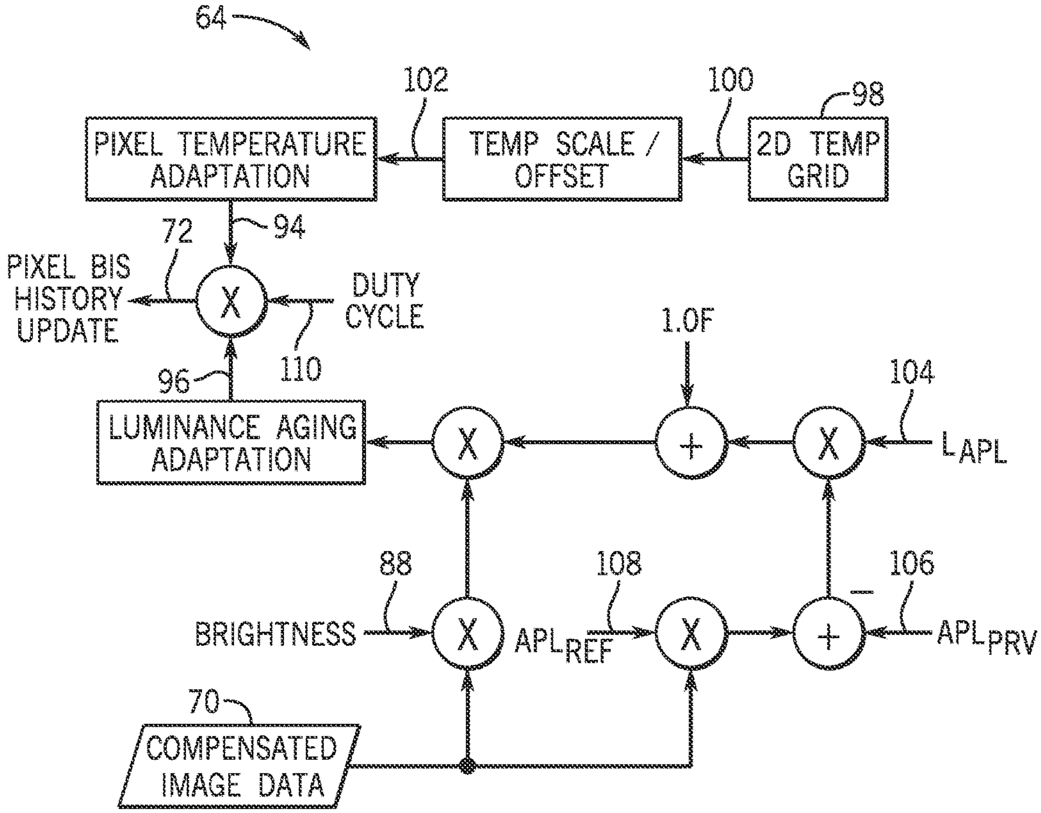
FIG. 10 is a schematic diagram of the pixel BIS sub-block of FIG. 8, in accordance with an embodiment.

FIG. 10 is a block diagram of an example pixel BIS sub-block 64 that utilizes the compensated image data 70 to generate a pixel BIS history update 72. In some embodiments, the pixel BIS history update 72 may be generated from a combination of a pixel temperature aging factor 94 and a luminance aging factor 96. The pixel temperature aging factor 94 takes into account the aging effect of temperature on pixel efficiency as the display pixels 60 are utilized to emit light. In some embodiments, a temperature grid 98 may provide temperatures 100 at one or more locations across the electronic device 10. As should be appreciated, the temperature grid 98 may be uniformly spaced or non-uniformly spaced across the display panel 40. Moreover, in some embodiments, the temperatures 100 for each display pixel 60 may be interpolated from the temperature grid 98. Furthermore, in some scenarios, a single temperature value (e.g., measured, estimated, or preset value) may utilized instead of individual temperatures 100. In some embodiments, the temperatures 100 (or single temperature value) may undergo a temperature scale/offset to define a temperature differential 102 indicative of the local temperature's delta from a preset temperature, and the temperature differential 102 may be used to calculate the pixel temperature aging factor 94. In other words, the temperature differential 102 may be used in a linear or non-linear equation (e.g., calculated via a look-up-table (LUT), one or more processors, etc.) to calculate an expected contribution to the pixel BIS history update 72 due to the temperature 100 of the display pixels 60. As should be appreciated, the temperature differential 102, temperature 100, or single temperature value may be used in determining the pixel temperature aging factor 94 depending on implementation.

Furthermore, the luminance aging factor 96, indicative of the expected contribution to the pixel BIS history update 72 due to the luminance output of the display pixels 60, may be calculated based on the compensated image data 70 and the global brightness setting 88. Additionally, one or more reference parameters (which may be included as gain parameters 76) such as the average pixel luminance of the image frame 104, the average pixel luminance of the previous image frame 106, and/or an average pixel luminance calibration reference value 108. Indeed, the changes from previous luminance levels to the current luminance levels may contribute to pixel aging, and one or more calibration/reference values may be used as part of the calculation of the luminance aging factor 96. Additionally, in some embodiments, the global brightness setting 88 may be normalized by the maximum global brightness setting 88. As should be appreciated, the parameters used herein are given as examples and additional or fewer reference parameters may be used in conjunction with the compensated image data 70 and/or global brightness setting 88 to generate the luminance aging factor 96. Moreover, in some embodiments, the luminance aging factor 96 may be calculated (e.g., via a LUT, one or more processors, etc.) via one or more linear or non-linear equations.

Moreover, in some embodiments, a duty cycle factor 110 (e.g., representative of the emission duty cycle of the display pixels 60 over an image frame) may be utilized to augment the combination of the pixel temperature aging factor 94 and the luminance aging factor 96. As should be appreciated, the emission duty cycle may be indicative of a pulse-width modulation or a time of emission during an image frame for a display pixel 60. For example, below a threshold brightness, the voltage and/or current may be held constant, and the emission pulse-width modulated at a particular duty cycle to obtain darker luminance levels. Moreover, the effect of burn-in on a display pixel 60 may differ at different emission duty cycles and, thus, the duty cycle factor 110 may be used to augment the pixel BIS history update 72.

Figure 11:
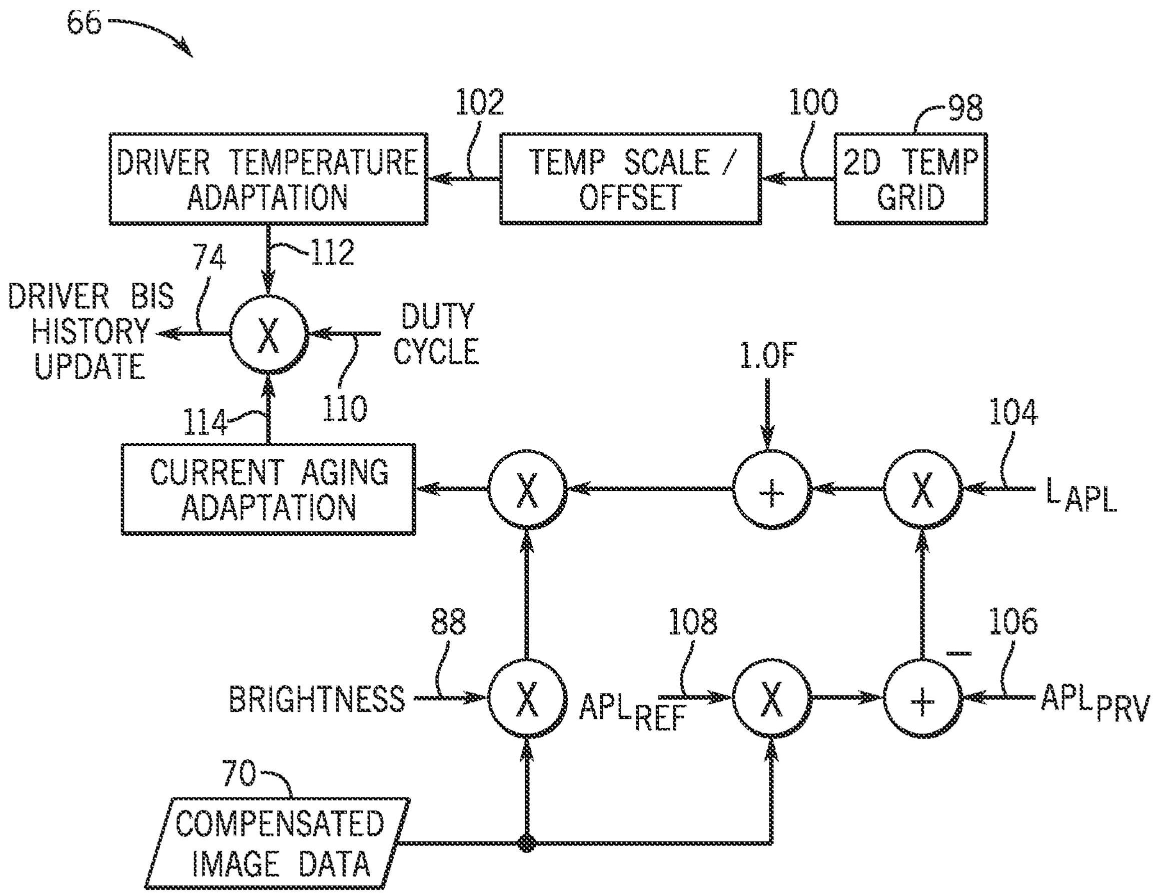
FIG. 11 is a schematic diagram of the driver BIS sub-block of FIG. 8, in accordance with an embodiment.

In a similar manner, FIG. 11 is a block diagram of an example driver BIS sub-block 66 that utilizes the compensated image data 70 to generate a driver BIS history update 74. In some embodiments, the driver BIS history update 74 may be generated from a combination of a driver temperature aging factor 112, a current aging factor 114, and/or the duty cycle factor 110. Similar to the display pixels 60, the temperature of the pixel drive circuitry 58 may affect the aging thereof. As such, the temperature 100 of the display pixel 60 associated with the pixel drive circuitry 58 or a separate temperature associated with the pixel drive circuitry 58 may be used to calculate the driver temperature aging factor 112. In a similar manner as the pixel temperature aging factor 94, the temperature 100 used to calculate the driver temperature aging factor 112 may be a temperature differential 102, temperature 100, or single (e.g., set for all or a group of display pixels) temperature value. However, as temperature may have a different contribution to the aging of the pixel drive circuitry 58 than the display pixels 60, the calculation of the driver temperature aging factor 112 may be different (e.g., by a non-linear relationship) from that of the pixel temperature aging factor 94. Moreover, in a similar manner to that of the pixel BIS history update 72, the duty cycle factor 110 may be used to augment the driver BIS history update 74, as the effect of burn-in on the pixel drive circuitry 58 may differ at different emission duty cycles. For example, burn-in related aging of pixel drive circuitry 58 may vary according to how long the current is delivered to a display pixel 60 by the pixel drive circuitry 58.

As the luminance aging factor 96 of the pixel BIS history update 72 accounts for the contribution of luminance output of the display pixels 60, the current aging factor 114 accounts for the contribution of current throughput of the pixel drive circuitry 58 on the driver BIS history update 74. In some embodiments, the current aging factor 114 may utilize one or more reference parameters (which may be included as gain parameters 76) such as the average pixel luminance of the image frame 104, the average pixel luminance of the previous image frame 106, and/or an average pixel luminance calibration reference value 108. As should be appreciated, the parameters used herein are given as examples and additional or fewer reference parameters may be used in conjunction with the compensated image data 70 and/or global brightness setting 88 to generate the current aging factor 114. Additionally, as with the luminance aging factor 96, in some embodiments, the global brightness setting 88 may be normalized by the maximum global brightness setting 88 when determining the current aging factor 114. However, current utilization may have a different contribution to the aging of the pixel drive circuitry 58 than luminance has on the display pixels 60. As such, the calculation of the current aging factor 114 may be different (e.g., by a non-linear relationship) from that of the luminance aging factor 96.

As discussed above, the driver BIS history update 74 may be generated from the current aging factor 114, driver temperature aging factor 112, and duty cycle factor 110, and the pixel BIS history update 72 may be generated from the luminance aging factor 96, pixel temperature aging factor 94, and duty cycle factor 110. In other words, there are different contributions and calculations to aging for the display pixels 60 and pixel drive circuitry 58. As such, for concurrent calculations of the pixel BIS history update 72 and the driver BIS history update 74, separate circuitry (e.g., the pixel BIS sub-block 64 and driver BIS sub-block 66) may be used for such calculations. Furthermore, in some scenarios, such as if concurrent history updates are not performed, due to the similarity of process flows, a portion of the same circuitry may be multiplexed (e.g., for separate image frames or for sequential calculation on the same image frame) for use across the pixel BIS sub-block 64 and the driver BIS sub-block 66.

Figure 12:
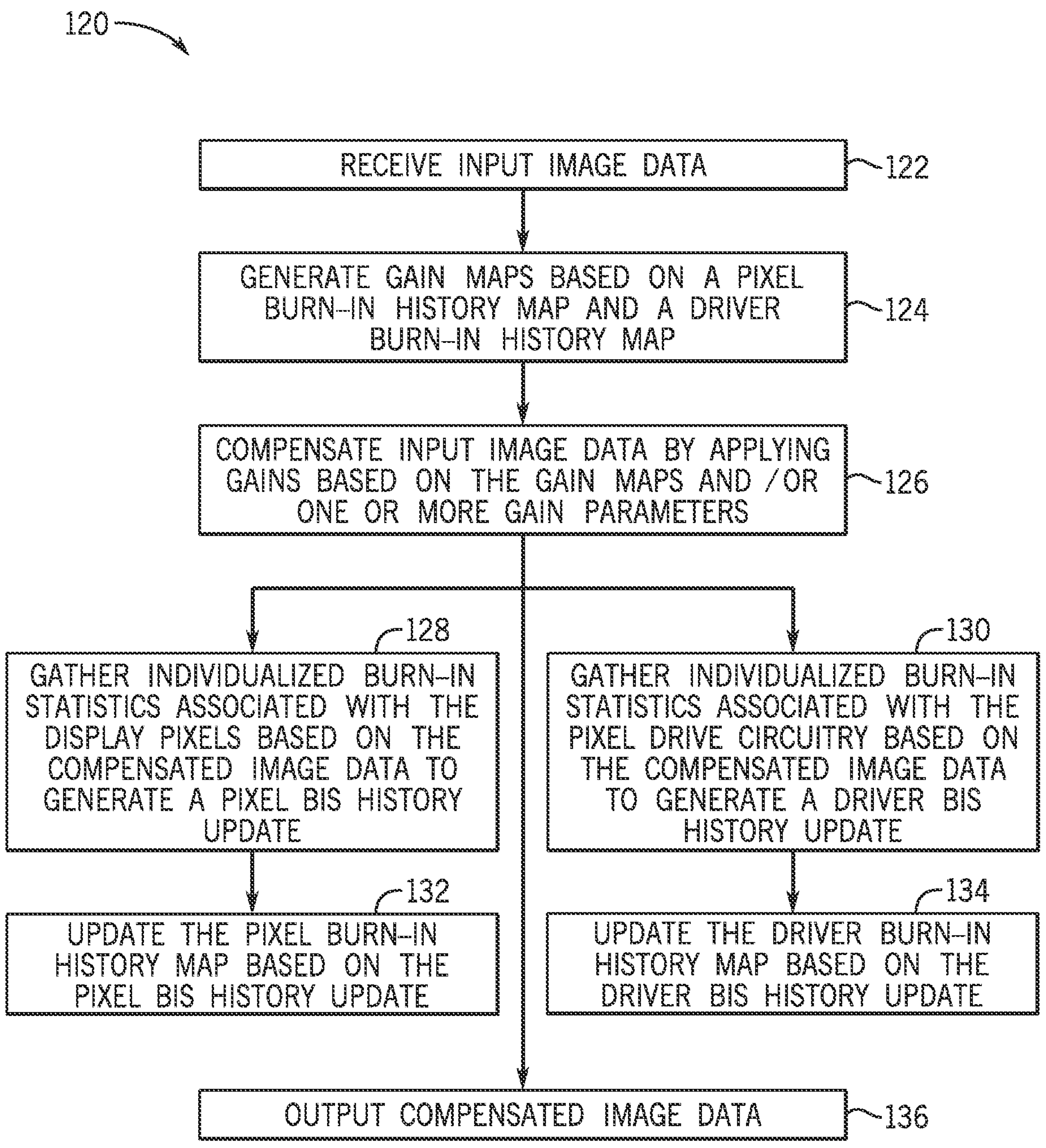
FIG. 12 is a flowchart of an example process for performing BIS collection and performing BIC, in accordance with an embodiment.

FIG. 12 is a flowchart 120 of an example process for performing burn-in compensation and statistics gathering. The BIC/BIS block 52 may receive input image data 68 (process block 122) and gain maps 82 may be generated based on a pixel burn-in history map 78 and a driver burn-in history map 80 (process block 124). Additionally, the input image data 68 may be compensated by applying gains according to the gain maps 82 and/or one or more gain parameters 76 (process block 126). Based on the compensated image data 70, individual (e.g., per-pixel) burn-in statistics associated with the display pixels 60 may be gathered to generate a pixel BIS history update 72 (process block 128). Additionally, based on the compensated image data 70, individual (e.g., per-pixel drive circuitry) burn-in statistics associated with the pixel drive circuitry 58 may be gathered to generate a driver BIS history update 74 (process block 130). Furthermore, the pixel burn-in history map 78 may be updated based on the pixel BIS history update 72 (process block 132), and the driver burn-in history map 80 may be updated based on the driver BIS history update 74 (process block 134). The compensated image data 70 may be output (process block 136) for example to be processed further (e.g., via one or more other processing blocks 54) or to the display panel 40 (e.g., as display image data 56).

By individually tracking the estimated amount of burn-in related aging that has taken place in the display pixels 60 and the pixel drive circuitry 58, per-pixel gains 92 may be derived (e.g., via gain maps 82 and/or gain parameters 76) to compensate for the effects of burn-in. In this way, the display pixels 60 of the electronic display 12 that exhibit non-uniform amounts of aging due to a reduction in pixel efficiency and/or a current reduction of the pixel drive circuitry 58 will appear to have aged uniformly. As such, perceivable burn-in artifacts on the electronic display 12 may be reduced or eliminated. Furthermore, although the flowchart 120 is shown in a given order, in certain embodiments, process/decision blocks may be reordered, altered, deleted, and/or occur simultaneously. Additionally, the flowchart 120 is given as an illustrative tool and further decision and process blocks may also be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:

an electronic display comprising:

display pixels configured to display an image based on compensated image data;

pixel drive circuitry configured to provide power to the display pixels based on the compensated image data;

burn-in compensation circuitry communicatively coupled to the electronic display, the burn-in compensation circuitry configured to:

receive input image data; and generate the compensated image data based on the input image data, a pixel aging history corresponding to the display pixels, and a driver aging history corresponding to the pixel drive circuitry; and burn-in statistics circuitry configured to:

update the driver aging history based on a first estimated amount of aging corresponding to a portion of the pixel drive circuitry associated with a pixel of the display pixels; and update the pixel aging history based on a second estimated amount of aging corresponding to the pixel, wherein the first estimated amount of aging and the second estimated amount of aging are based on the same compensated image data.

2. The electronic device of claim 1, wherein the pixel aging history and the driver aging history are tracked independently.

3. The electronic device of claim 1, wherein the burn-in statistics circuitry is configured to determine the first estimated amount of aging corresponding to the portion of the pixel drive circuitry associated with the pixel of the display pixels based on a pixel value of the compensated image data associated with the pixel, wherein the portion of the pixel drive circuitry is configured to supply current to the pixel based on the pixel value.

4. The electronic device of claim 3, wherein the burn-in statistics circuitry is configured to determine the second estimated amount of aging corresponding to the pixel based on the pixel value of the compensated image data.

5. The electronic device of claim 4, wherein the first estimated amount of aging and the second estimated amount of aging are determined, at least in part, via independent hardware.

6. The electronic device of claim 3, wherein the first estimated amount of aging corresponding to the portion of the pixel drive circuitry is based on:

a current aging factor indicative of burn-in related aging of the portion of the pixel drive circuitry due to the current supplied to the pixel by the portion of the pixel drive circuitry; and a temperature aging factor indicative of the burn-in related aging of the portion of the pixel drive circuitry due to temperature.

7. The electronic device of claim 6, wherein the current aging factor is based on the pixel value and a global brightness setting.

8. The electronic device of claim 1, wherein generating the compensated image data comprises generating a gain map based on the pixel aging history and the driver aging history, wherein the gain map comprises per-pixel gains configured to compensate, at least in part, the input image data for burn-in related aging of the display pixels and the pixel drive circuitry.

9. The electronic device of claim 1, wherein the pixel aging history comprises a per-pixel pixel aging history, and wherein the driver aging history comprises a per-pixel driver aging history.

10. The electronic device of claim 1, wherein the display pixels comprise organic light-emitting-diode (OLED) display pixels.

11. Image processing circuitry comprising:

pixel burn-in statistics circuitry configured to:

determine a first set of estimated amounts of aging associated with display pixels of an electronic display based on pixel values of compensated image data; and update a pixel burn-in history map based on the first set of estimated amounts of aging;

driver burn-in statistics circuitry configured to:

determine a second set of estimated amounts of aging associated with portions of pixel drive circuitry of the electronic display based on the pixel values of the compensated image data, wherein the portions of the pixel drive circuitry are configured to deliver current to corresponding display pixels of the display pixels, wherein the pixel burn-in statistics circuitry is configured to determine the estimated amounts of aging associated with the display pixels and the driver burn-in statistics circuitry is configured to determine the estimated amounts of aging associated with the portions of the pixel drive circuitry, at least in part, via independent hardware; and update a driver burn-in history map based on the second set of estimated amounts of aging; and burn-in compensation circuitry configured to compensate image data for burn-in related aging of the display pixels and the burn-in related aging of the portions of the pixel drive circuitry based on the pixel burn-in history map and the driver burn-in history map to generate the compensated image data.

12. The image processing circuitry of claim 11, wherein determining the first set of estimated amounts of aging comprises:

determining a luminance aging factor indicative of a first contribution to the burn-in related aging of the display pixels associated with luminance outputs of the display pixels; and determining a pixel temperature aging factor indicative of a second contribution to the burn-in related aging of the display pixels associated with temperature.

13. The image processing circuitry of claim 12, wherein determining the second set of estimated amounts of aging comprises:

determining a current aging factor indicative of a third contribution to the burn-in related aging of the portions of the pixel drive circuitry associated with currents output by the portions of the pixel drive circuitry to the display pixels; and determining a driver temperature aging factor indicative of a fourth contribution to the burn-in related aging of the portions of the pixel drive circuitry associated with temperature.

14. The image processing circuitry of claim 13, wherein determining the second set of estimated amounts of aging comprises modifying a combination of the current aging factor and the driver temperature aging factor by an emission duty cycle factor indicative of a duty cycle of the display pixels.

15. The image processing circuitry of claim 11, wherein the pixel burn-in statistics circuitry is configured to determine the first set of estimated amounts of aging and the driver burn-in statistics circuitry is configured to determine the second set of estimated amounts of aging concurrently.

16. The image processing circuitry of claim 11, wherein the burn-in compensation circuitry is configured to:

generate one or more gain maps of per-pixel gains based on the pixel burn-in history map and the driver burn-in history map; and combine the one or more gain maps with one or more gain parameters and the image data to generate the compensated image data.

17. The image processing circuitry of claim 16, wherein the one or more gain parameters comprise a global brightness setting of the electronic display, a normalization factor, a duty cycle factor, or any combination thereof.

18. A non-transitory machine readable medium comprising instructions, wherein, when executed by one or more processors, the instructions cause the one or more processors to control image processing circuitry to perform operations or to perform the operations, wherein the operations comprise:

determining a first set of estimated amounts of aging associated with display pixels of an electronic display based on pixel values of compensated image data;

updating a pixel burn-in history map based on the first set of estimated amounts of aging;

determining a second set of estimated amounts of aging associated with portions of pixel drive circuitry of the electronic display based on the pixel values of the compensated image data, wherein the portions of the pixel drive circuitry are configured to deliver current to corresponding display pixels of the display pixels, and wherein determining the second set of estimated amounts of aging comprises:

determining current aging factors indicative of burn-in related aging of the portions of the pixel drive circuitry due to the current delivered to the display pixels by the portions of the pixel drive circuitry; and determining temperature aging factors indicative of the burn-in related aging of the portions of the pixel drive circuitry due to temperature; and updating a driver burn-in history map based on the second set of estimated amounts of aging.

19. The non-transitory machine readable medium of claim 18, wherein the operations comprise compensating input image data for burn-in related aging of the display pixels and the burn-in related aging of the portions of the pixel drive circuitry based on the pixel burn-in history map and the driver burn-in history map to generate the compensated image data.

20. The non-transitory machine readable medium of claim 18, wherein the first set of estimated amounts of aging is based on luminance outputs of the display pixels according to the compensated image data, and wherein the second set of estimated amounts of aging is based on current flows through the portions of the pixel drive circuitry according to the compensated image data.

* * * * *